R. MEYER.

AUTOMATIC PLATE VALVE.

APPLICATION FILED AUG. 2, 1915.

Reissued Oct. 12, 1915. 13,991.

Inventor:
Robert Meyer
by his Attys.:
Philip Lanyon Rice Kennedy

UNITED STATES PATENT OFFICE.

ROBERT MEYER, OF MÜLHEIM-RUHR, GERMANY, ASSIGNOR, BY MESNE ASSIGNMENTS, TO C. P. COLEMAN AND G. M. P. MURPHY, RECEIVERS OF INTERNATIONAL STEAM PUMP COMPANY, A CORPORATION OF NEW JERSEY.

AUTOMATIC PLATE-VALVE.

13,991. Specification of Reissued Letters Patent. Reissued Oct. 12, 1915.

Original No. 1,019,683, dated March 5, 1912. Serial No. 579,144. Application for reissue filed August 2, 1915. Serial No. 43,354.

*To all whom it may concern:*

Be it known that I, ROBERT MEYER, a subject of the German Emperor, and residing at Mülheim-Ruhr, Germany, have invented certain new and useful Improvements in Automatic Plate-Valves, of which the following is a specification.

My invention relates to automatic plate-valves, in which the valve plate consists of a simple strip-shaped leaf spring of constant section which lies extended on the valve seat, is weakened neither by holes nor slots, and becomes bent upwardly by the flowing medium. In the well known valves of this type the strip-shaped plate is firmly clamped at one end while its other end is mounted displaceable longitudinally in order to enable the valve plate to bend upward. This known arrangement has the material disadvantage that the two ends of the plate are subjected to bending stresses and stresses due to axial compression which impair the durability of the plate, particularly at the fixed end, and unavoidably cause the plate to fracture. Further, the ready movability of the valve is impaired in consequence of the ends of the plate bending.

A primary object of my invention is to provide a plate-valve to which the defects described above are not attached, and which is particularly adapted for use in pumps for conveying gases and liquids. To this end, I mount the valve-plate in such manner on the valve seat that it can bend upward the intended height without being subjected at any place to the least lateral flexure or excessive transverse stress and without the departing from the normal bending-line.

One illustrative embodiment of my invention is represented by way of example in the accompanying drawing, wherein:—

Figure 1:
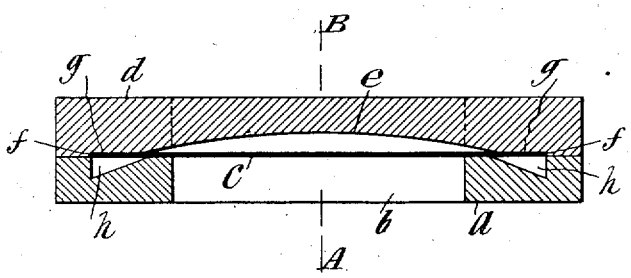
Figure 2:
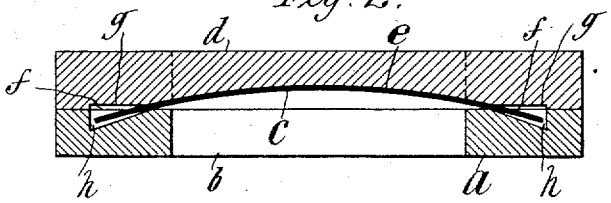
Figure 3:
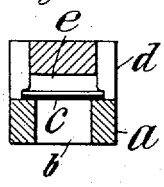
Figure 4:
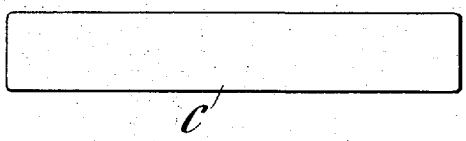

Figure 1 is a longitudinal section through the closed valve and Fig. 2 a like section through the open valve; Fig. 3 is a cross-section on the line A—B in Fig. 1, while Fig. 4 is a plan view of the plate only.

Referring to the drawing, an elastic, thin, metal strip *c* of constant section rests on the valve seat *a* which is provided with one or more slots *b*. Above the valve seat is arranged in well-known manner a cap or arrester *d* having a recess *e* of arc-shaped section whose crown is on the center line A—B and exactly determines the form of arc of the plate *c* when it is bent upwardly by the flowing medium. Flat recesses *f* are provided in the cap or arrester, and allow the ends of the plates the very little play required for their movement and assure their correct position relatively to the seat. The faces *g* of the recesses *f* prevent the strip *c* from being lifted parallel to the face of the seat and the side walls of the recesses *f* hold the strip in position edgewise. The recesses *f* are enlarged, preferably triangularly, for the free play of the ends of the strip, as shown at *h*. By means of this arrangement I provide in a new manner that the strip is bent upward by the flowing medium according to a perfectly uniform bending-line in such manner that injurious lateral flexure or excessive transverse stresses due to bending do not occur at any part of the strip. Accordingly, the subject-matter of my invention differs from well-known valves of the type described in that the elastic plate *c* is mounted in such manner that, when the valve moves, it behaves like a loaded, elastic rod resting on two supports.

In special cases I may make the plate broader in the center in the event of greater section of valve being requisite with a given length; also I may arrange several plates superposed or beside one another for obtaining larger connected systems of valves. Further, by making the face of the seat slightly concave a certain tension can be given in the simplest manner to the strip pressed by the ends of the arrester.

The subject-matter of my invention can be employed equally well both as a pressure and as a suction valve. The scope of my invention is not departed from when the material of the valve or plate is made of some other elastic material instead of metal, according to the nature of the medium which is supplied in each instance, or when the subject-matter of my invention is employed for any other purposes than for pumps for conveying gases and liquids.

I claim—

1. An automatic plate-valve of the type described, comprising in combination a valve-seat having recesses with inclined faces, a thin elastic plate or strip extending into said recesses, and a cap or arrester having a recess of arc-shaped section holding the plate or strip on the valve seat and exactly determining the upward movement of the same.

2. An automatic plate-valve of the type described, comprising in combination a valve-seat having two recesses with inclined faces, a thin elastic, oblong, metal plate extending into said recesses, and a cap having a curved recess and two recesses at the ends of the plate for holding the plate on the valve-seat and exactly determining the upward movement of the same, substantially as shown.

3. An automatic plate-valve of the type described, comprising in combination a valve-seat, a thin elastic plate or strip forming a valve and having both ends free to permit bending of the plate on a uniform bending line in opening, and a cap or arrester holding the plate on the valve-seat and determining the opening movement of the same.

4. An automatic plate-valve of the type described, comprising in combination a valve-seat, a thin elastic plate or strip forming a valve and having both ends free to permit bending of the plate on a uniform bending line in opening, and a cap or arrester determining the opening movement of the plate and having recesses at the ends of the plate for holding the plate in position on the valve seat.

In testimony whereof, I have signed my name to this specification in the presence of two witnesses.

ROBERT MEYER. [L. S.]

Witnesses:

ALBERT NUFER,
HELEN NUFER.